či
3,122,548
S-PHENETHYLOXY CARBONYL THIAMINE O-MONOPHOSPHATE AND THE HYDROCHLORIDE THEREOF

Akira Takamizawa, Ibaraki-shi, Osaka Prefecture, and Kentaro Hirai, Kyoto-shi, Kyoto Prefecture, Japan, assignors to Shionogi & Co., Ltd., Osaka-shi, Japan
No Drawing. Filed Dec. 11, 1961, Ser. No. 158,536
Claims priority, application Japan Dec. 16, 1960
2 Claims. (Cl. 260—256.5)

This invention relates to novel thiamine derivatives and processes for their manufacture. More particularly, the invention relates to S-alkoxy- or -aralkoxycarbonylthiamine O-monophosphates showing rapid and prolonged vitamin $B_1$ activity, which can be represented by the formula:

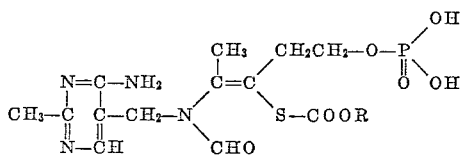

wherein R is alkyl such as methyl, ethyl, propyl or butyl or aralkyl such as benzyl, phenethyl or phenylpropyl.

The compounds of the present invention may be prepared by reacting S-alkoxy- or -aralkoxycarbonylthiamine with monohalogenophosphoric acid and the reaction may be represented by the following formula:

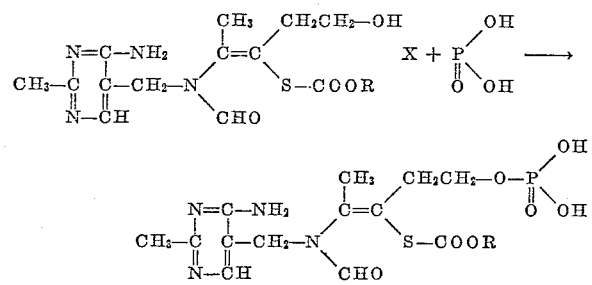

wherein R has the same significance as designated above and X is halogen such as chlorine or bromine.

The starting materials of the present invention, S-alkoxy- or -aralkoxycarbonylthiamine, are novel compounds and can be prepared by reacting thiol-type thiamine with alkyl or aralkyl halogenocarbonates at a low temperature or by reacting thiol-type thiamine with alkyl or aralkyl nitrophenyl carbonates under reflux. For instance, S-ethoxycarbonylthiamine is prepared by reacting thiol-type thiamine with ethyl chlorocarbonate while ice-cooling, and S-phenethyloxycarbonylthiamine is prepared by reacting thiol-type thiamine with phenethyl p-nitrophenyl carbonate while refluxing.

The reagent of the present invention may be monohalogenophosphoric acid such as monochlorophosphoric acid or monobromophosphoric acid. For the esterification of a free hydroxyl radical, orthophosphoric acid or pyrophosphoric acid has been heretofore employed in general. However, when orthophosphoric acid or pyrophosphoric acid is used, the by-products are produced in such amounts that the purification of the main product is difficult. In the present invention, the use of monohalogenophosphoric acid is preferred for producing the objective S-alkoxy- or -aralkyloxycarbonylthiamine O-monophosphates in high purity. The monohalogenophosphoric acid used in the present invention may be prepared by adding an amount of water, corresponding to the theoretical, to phosphoryl halide and expelling the produced hydrogen halide from the resulting mixture.

The reaction of S-alkoxy- or -aralkyloxycarbonylthiamine with monohalogenophosphoric acid may be carried out in an inert organic solvent, preferably in a halogenated hydrocarbon of a low boiling point such as chloroform, monochloromethane, dichloromethane or dichloroethane. Although the reaction is in general preferably executed at a temperature lower than room temperature (15–30° C.), the reaction carried out under heating sometimes gives the objective compound in a good yield.

The products of the present invention, S-alkoxy or aralkyloxycarbonylthiamine O-monophosphates, are useful as specific vitamin $B_1$ activity possessing agents. For instance, S-ethoxycarbonylthiamine O-monophosphate can be absorbed from the intestinal canal rapidly and retained in the blood in high concentration for a longer time, compared to thiamine hydrochloride and thiamine propyl disulfide, as shown in the following table:

TABLE

| Time (hours) | Vitamin $B_1$ concentration in blood ($\gamma$/dl.) | | | | | |
|---|---|---|---|---|---|---|
| | 0 | 0.5 | 1 | 3 | 5 | 8 |
| Thiamine hydrochloride | 22.2 | 24.2 | 27.5 | 32.9 | 34.4 | 28.7 |
| Thiamine propyl disulfide | 23.1 | 38.9 | 50.9 | 62.9 | 52.3 | 39.7 |
| S-ethoxycarbonylthiamine O-monophosphate hydrochloride | 20.6 | 43.9 | 64.7 | 83.0 | 74.3 | 61.3 |

Each of thiamine hydrochloride, thiamine propyl disulfide and S-ethoxycarbonylthiamine O-monophosphate hydrochloride was administered per os to each of tested rabbits in an amount of 5 milligrams per kilogram of body weight.

Thus, the products may be used for displaying rapidly and maintaining for a longer time vitamin $B_1$ activity.

The following examples set forth, by way of illustration, presently-preferred embodiments of the invention. In the examples, all temperatures are expressed in degrees centigrade (°C.).

Example 1

To a solution of 0.6 gram of sodium chloride in 2 millilitres of water are added 0.6 gram of tributylamine and 0.4 gram of ethyl chlorocarbonate. To the resultant solution, there is added 1 gram of sodium salt of thiol-type thiamine with stirring. During the reaction, white syrupy substance is formed gradually and soon the reaction mixture becomes clotty. The clotted product is separated by filtration, washed with water and dried to give 1 gram of crude S-ethoxycarbonylthiamine. Recrystallizing from a mixture of ethanol and ethyl acetate, there is obtained 0.8 gram of the pure product as colorless cubic crystals melting at 140° C. (decomp.).

To a solution of 1.42 grams of S-ethoxycarbonylthiamine, prepared as above, in 16 millilitres of chloroform, there is added 0.71 gram of monochlorophosphoric acid while ice-cooling, and the resulting solution is stirred. The crystallized solid mass is collected by filtration and washed with ether to give 0.2 gram of the crude product as a colorless mass melting at 151° C. (decomp.). The mass is dissolved in a small amount of water and treated with calcium carbonate. The resultant mass is concentrated in vacuo and the residue is recrystallized from dilute ethanol to yield pure S-ethoxycarbonylthiamine O-monophosphate hydrochloride as colorless cubic crystals melting at 173° C. (decomp.). It shows positive in molybdenum blue test, negative in thiochrome test but positive after treatment with an alkali and positive in halogen test. It gives a single spot on paper partition chromatography ($Rf$=0.61, butanol:acetic acid:water=4:1:5).

*Analysis.*—Calcd. for $C_{15}H_{23}O_7N_4SP.HCl$: P, 6.59. Found: P, 6.93.

The hydrochloride can be converted into the free base in the conventional manner, i.e. treatment with an alkali.

Example 2

To a solution of 2.08 grams of S-phenethyloxycarbonyl-thiamine, which is prepared in a manner similar to that for the production of S-ethoxycarbonylthiamine, in 20 millilitres of chloroform, there is added 0.83 gram of monochlorophosphoric acid, and the resulting solution is treated as described in Example 1 to give S-phenethyloxycarbonylthiamine O-monophosphate hydrochloride as colorless crystals.

What is claimed is:
1. S-phenethyloxycarbonylthiamine O-monophosphate.
2. S-phenethyloxycarbonylthiamine O-monophosphate hydrochloride.

References Cited in the file of this patent

UNITED STATES PATENTS

| | | |
|---|---|---|
| 2,752,348 | Matsukawa et al. | June 26, 1956 |
| 3,064,000 | Ito et al. | Nov. 13, 1962 |

OTHER REFERENCES

Kawasaki: J. Pharm. Soc. Japan, vol. 76, pp. 543–5 (1956).

Gerrard: J. Chem. Soc. (London), (1945), pp. 106–12.

Fuente et al.: Chem. Abstracts, vol. 50, p. 12142a (1956).

Groggins: Unit Processes in Organic Synthesis (New York, 1958), pages 723–6.